United States Patent
Ahn

(10) Patent No.: US 12,305,808 B2
(45) Date of Patent: May 20, 2025

(54) CRYOGENIC LIQUID STORAGE APPARATUS

(71) Applicants: HYUNDAI MOTOR COMPANY, Seoul (KR); Kia Corporation, Seoul (KR)

(72) Inventor: Jun Sung Ahn, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 42 days.

(21) Appl. No.: 18/230,851

(22) Filed: Aug. 7, 2023

(65) Prior Publication Data

US 2024/0418317 A1    Dec. 19, 2024

(30) Foreign Application Priority Data

Mar. 16, 2023    (KR) .......................... 10-2023-0034678

(51) Int. Cl.
*F17C 1/12*    (2006.01)
*H01M 8/04082*    (2016.01)

(52) U.S. Cl.
CPC ........... *F17C 1/12* (2013.01); *H01M 8/04208* (2013.01); *F17C 2203/0391* (2013.01); *F17C 2227/0304* (2013.01); *F17C 2227/0379* (2013.01)

(58) Field of Classification Search
CPC ................ F17C 1/12; F17C 2203/0391; F17C 2203/0629; F17C 2227/0304; F17C 2227/0379; F17C 2227/0381; H01M 8/04208
USPC ........................................................ 137/341
See application file for complete search history.

(56) References Cited

U.S. PATENT DOCUMENTS

| | | | | |
|---|---|---|---|---|
| 4,608,831 | A | * | 9/1986 | Gustafson ................. F17C 3/08 62/48.1 |
| 4,765,507 | A | * | 8/1988 | Yavorsky .................. F17C 1/16 220/661 |
| 2009/0200318 | A1 | * | 8/2009 | Handa ....................... F17C 7/00 220/586 |
| 2010/0193717 | A1 | * | 8/2010 | Tanikawa ................ F16K 41/10 137/341 |
| 2016/0348841 | A1 | | 12/2016 | Jones et al. |
| 2020/0325854 | A1 | | 10/2020 | Bartlok |
| 2021/0372570 | A1 | | 12/2021 | Stubenrauch |
| 2022/0136656 | A1 | | 5/2022 | Clarke et al. |

FOREIGN PATENT DOCUMENTS

| | | |
|---|---|---|
| JP | 2005-9549 A | 1/2005 |
| KR | 10-2007-0037734 A | 4/2007 |
| KR | 10-2011-0048138 A | 5/2011 |
| KR | 10-2390188 A | 4/2022 |
| KR | 10-2022-0074524 A | 6/2022 |

* cited by examiner

*Primary Examiner* — Kelsey E Cary
(74) *Attorney, Agent, or Firm* — Morgan Lewis & Bockius LLP

(57) ABSTRACT

A cryogenic liquid storage apparatus includes a storage container configured to accommodate a cryogenic liquid, a heating element configured to be movable from a first position at which the heating element is in contact with the storage container to a second position at which the heating element is spaced from the storage container, and a drive portion configured to selectively provide driving power to the heating element to move the heating element from the second position to the first position, obtaining an advantageous effect of improving efficiency in storing hydrogen.

20 Claims, 9 Drawing Sheets

CRYOGENIC LIQUID STORAGE APPARATUS

CROSS-REFERENCE TO RELATED APPLICATION

The present application claims priority to Korean Patent Application No. 10-2023-0034678 on Mar. 16, 2023, the entire contents of which is incorporated herein for all purposes by this reference.

BACKGROUND OF THE PRESENT DISCLOSURE

Field of the Present Disclosure

The present disclosure relates to a cryogenic liquid storage apparatus, and more particularly, to a cryogenic liquid storage apparatus capable of improving efficiency in storing a cryogenic liquid.

Description of Related Art

A fuel cell system refers to a system that produces electrical energy by a redox reaction between hydrogen and oxygen. Research and development have been consistently performed on the fuel cell system as an alternative capable of solving global environmental issues.

Recently, to increase an energy storage density per unit volume of fuel (e.g., hydrogen) used for the fuel cell system, various attempts have been made to store liquid hydrogen in a storage container at an extremely low temperature (e.g., 20 K to 33K) and supply the fuel cell stack with the hydrogen (liquid hydrogen or gaseous hydrogen) stored in the storage container.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a cryogenic liquid storage apparatus configured for improving efficiency in storing a cryogenic liquid.

The present disclosure has been made in an effort to ensure thermal insulation performance of a storage container and increase pressure (temperature) of the cryogenic liquid only when necessary (only in a situation in which an increase in pressure of the cryogenic liquid is required).

Among other things, the present disclosure has been made in an effort to increase pressure (temperature) of the cryogenic liquid by applying heat to the cryogenic liquid only when internal pressure of the storage container decreases, and to minimize heat to be transferred to the cryogenic liquid from the outside of the storage container when the internal pressure of the storage container satisfies a preset condition.

Furthermore, the present disclosure has been made in an effort to minimize an increase in pressure of the cryogenic liquid due to residual heat of a heating element.

Furthermore, the present disclosure has been made in an effort to more accurately and precisely manage the internal pressure of the storage container.

Furthermore, the present disclosure has been made in an effort to ensure durability and safety, minimize a loss of hydrogen (the discharge amount of hydrogen), and maximally delay a time point of a loss of hydrogen (extend a non-loss hydrogen storage period).

The objects to be achieved by the exemplary embodiments are not limited to the above-mentioned objects, but also include objects or effects which may be understood from the solutions or embodiments described below.

To achieve the above-mentioned objects, an exemplary embodiment of the present disclosure provides a cryogenic liquid storage apparatus including: a storage container configured to accommodate a cryogenic liquid therein; a heating element configured to be movable from a first position at which the heating element is in contact with the storage container to a second position at which the heating element is spaced from the storage container; and a drive portion configured to selectively provide driving power to the heating element to move the heating element from the second position to the first position.

According to the exemplary embodiment of the present disclosure, the storage container may include: an internal container configured to accommodate the cryogenic liquid therein; and an external container configured to surround a periphery of the internal container therein, and the heating element may be movable in directions in which the heating element approaches and moves away from an external surface of the internal container.

According to the exemplary embodiment of the present disclosure, the cryogenic liquid storage apparatus may include: a heat transfer structure configured to surround a periphery of the heating element, in which heat generated by the heating element is transferred to the internal container via the heat transfer structure.

According to the exemplary embodiment of the present disclosure, the heat transfer structure may include: a piston portion configured to be movable in directions in which the piston portion approaches and moves away from the internal container by the drive portion; and a contact portion provided at an end portion of the piston portion while surrounding a periphery of the heating element and configured to come into contact with the internal container.

According to the exemplary embodiment of the present disclosure, the contact portion may include a cross-sectional area further expanded than a cross-sectional area of the heating element.

According to the exemplary embodiment of the present disclosure, the contact portion may come into surface-contact with the external surface of the internal container.

According to the exemplary embodiment of the present disclosure, a contact surface of the contact portion, which comes into contact with the internal container, may be defined as a flat surface.

According to the exemplary embodiment of the present disclosure, a contact surface of the contact portion, which comes into contact with the internal container, may be defined as a non-flat surface.

According to the exemplary embodiment of the present disclosure, the drive portion may include a solenoid, and the piston portion may be selectively moved rectilinearly by driving power of the solenoid.

According to the exemplary embodiment of the present disclosure, the cryogenic liquid storage apparatus may include: an elastic member configured to provide an elastic force to move the piston portion in a direction in which the piston portion moves away from the internal container.

According to the exemplary embodiment of the present disclosure, the cryogenic liquid storage apparatus may include a through-hole provided in the external container, in which the piston portion is provided to pass through the through-hole, and the drive portion is provided outside the external container.

According to the exemplary embodiment of the present disclosure, the cryogenic liquid storage apparatus may include a sealing member configured to seal a gap between the piston portion and the through-hole.

According to the exemplary embodiment of the present disclosure, the cryogenic liquid storage apparatus may include a stopper portion configured to be restrained by an internal surface of the external container.

According to the exemplary embodiment of the present disclosure, the cryogenic liquid storage apparatus may include: a heat transfer member provided on an internal surface of the internal container, in which the heating element comes into contact with the external surface of the internal container that corresponds to the heat transfer member.

According to the exemplary embodiment of the present disclosure, the heat transfer member may include: a body portion protruding from the internal surface of the internal container; and a fin portion protruding from a surface of the body portion.

According to the exemplary embodiment of the present disclosure, the cryogenic liquid storage apparatus may include a thermal conduction layer provided between the heat transfer member and the internal container.

According to the exemplary embodiment of the present disclosure, the cryogenic liquid storage apparatus may include a heat transfer portion provided integrally with the internal container to protrude from the internal surface of the internal container and configured to define an accommodation space for accommodating the heating element therein.

According to the exemplary embodiment of the present disclosure, the cryogenic liquid storage apparatus may include a vacuum thermal insulation layer defined between the internal container and the external container.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
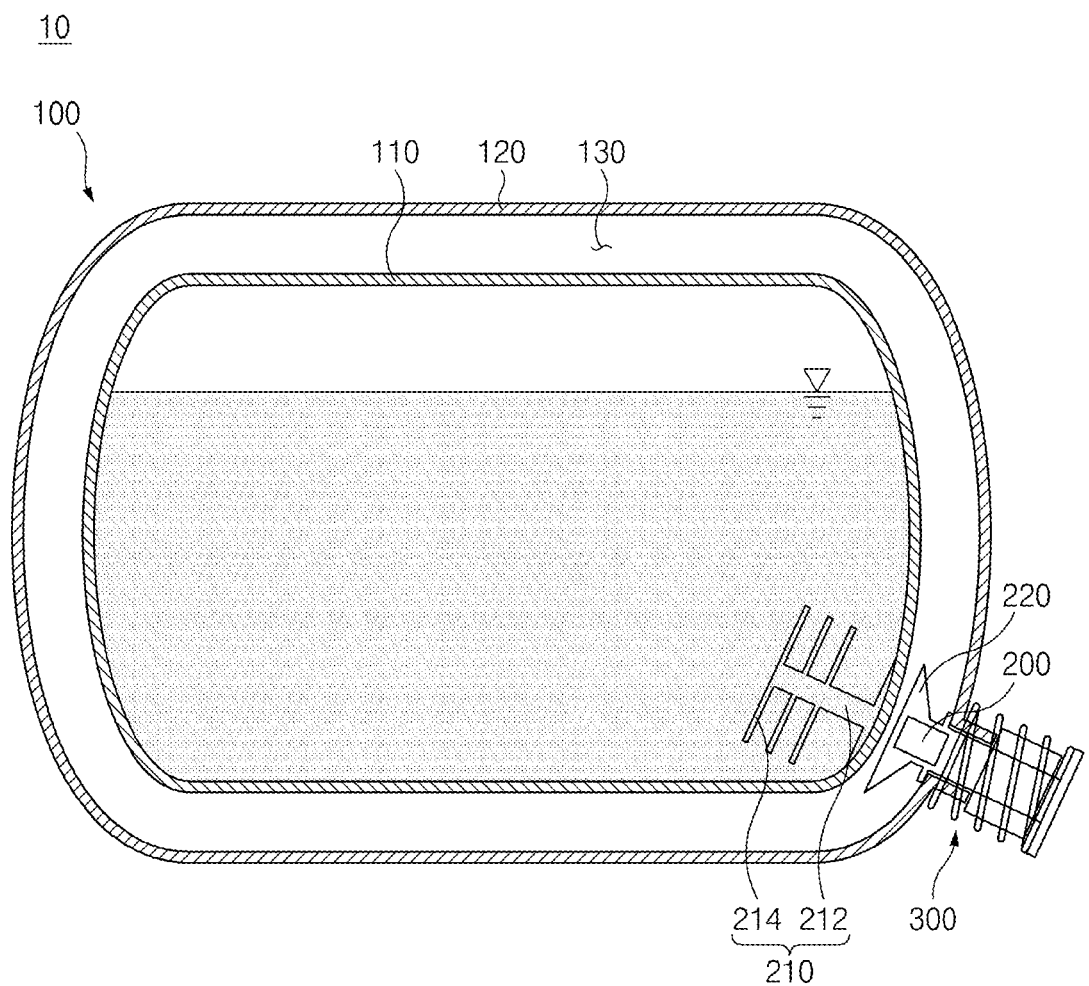
FIG. 1 is a view for explaining a cryogenic liquid storage apparatus according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings.

However, the technical spirit of the present disclosure is not limited to various exemplary embodiments described herein but may be implemented in various different forms. One or more of the constituent elements in the exemplary embodiments may be selectively combined and substituted for use within the scope of the technical spirit of the present disclosure.

Furthermore, unless otherwise specifically and explicitly defined and stated, the terms (including technical and scientific terms) used in the exemplary embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

Furthermore, the terms used in the exemplary embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that may be made by combining A, B, and C.

Furthermore, the terms such as first, second, A, B, (a), and (b) may be used to describe constituent elements of the exemplary embodiments of the present disclosure.

These terms are used only for discriminating one constituent element from another constituent element, and the nature, the sequences, or the orders of the constituent elements are not limited by the terms.

Furthermore, when one constituent element is described as being 'connected', 'coupled', or 'attached' to another constituent element, one constituent element may be connected, coupled, or attached directly to another constituent element or connected, coupled, or attached to another constituent element through yet another constituent element interposed therebetween.

Furthermore, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

With reference to FIG. 1, FIG. 2, FIG. 3, FIG. 4, FIG. 5, FIG. 6, FIG. 7, FIG. 8 and FIG. 9, a cryogenic liquid storage apparatus 10 according to an exemplary embodiment of the present disclosure includes a storage container 100 configured to accommodate a cryogenic liquid, a heating element 200 configured to be movable from a first position at which the heating element 200 is in contact with the storage container 100 to a second position at which the heating element 200 is spaced from the storage container 100, and a drive portion 300 configured to selectively provide driving power to move the heating element 200 from the second position to the first position.

This is to improve efficiency in storing the cryogenic liquid (e.g., liquid hydrogen).

That is, to ensure efficiency in supplying the cryogenic liquid (e.g., efficiency in supplying hydrogen to be supplied to a fuel cell stack from the storage container, it is necessary to increase pressure (temperature) of the cryogenic liquid by applying heat to the cryogenic liquid when internal pressure of the storage container (pressure of the liquid hydrogen) decreases to a predetermined degree or lower.

However, the related art includes a problem in that unnecessary heat is transferred to the storage container 100 (cryogenic liquid) by a heat transfer member 210 configured to transfer heat to the cryogenic liquid (e.g., a pipe passing through the inside of the storage container) even in a situation in which internal pressure of the storage container is sufficient (a situation in which it is unnecessary to apply heat to the cryogenic liquid).

When the pressure of the storage container 100 increases as heat is applied to the storage container 100 (pressure is increased by vaporization of the liquid hydrogen), there is a problem in that hydrogen (cryogenic liquid) in the storage container 100 is inevitably discharged immediately to the outside of the storage container 100, which causes an increase in the amount of hydrogen discharged from the storage container 100 (the amount of loss of hydrogen) increases, and a decrease in a non-loss hydrogen storage period (dormancy).

In contrast, according to the exemplary embodiment of the present disclosure, the heating element, which applies heat to the storage container 100, may selectively come into contact with the storage container 100. Therefore, it is possible to increase the pressure (temperature) of the cryogenic liquid only when necessary (only in a situation in which an increase in pressure of the cryogenic liquid is required) while ensuring thermal insulation performance of the storage container 100.

Among other things, according to the exemplary embodiment of the present disclosure, it is possible to obtain an advantageous effect of increasing the pressure (temperature) of the cryogenic liquid by bringing the heating element 200 into contact with the storage container 100 only when the internal pressure of the storage container 100 decreases, and an advantageous effect of minimizing (blocking) heat to be transferred to the storage container 100 through the heating element 200 by allowing the heating element 200 to be spaced from the storage container 100 when the internal pressure of the storage container 100 satisfies a preset condition.

Therefore, it is possible to suppress an unnecessary increase in temperature and excessive vaporization of the cryogenic liquid (liquid hydrogen) due to heat applied (transferred) from the outside of the storage container 100. Therefore, it is possible to obtain an advantageous effect of suppressing an excessive increase in pressure of the storage container 100, minimizing the discharge amount of hydrogen to be discharged from the storage container 100 (the amount of loss of hydrogen to be discarded), and maximally delaying a time point of a loss of hydrogen (extending a non-loss hydrogen storage period).

Moreover, according to the exemplary embodiment of the present disclosure, when the pressure of the cryogenic liquid reaches a preset target pressure, the heating element 200 may move away from the storage container 100. Therefore, it is possible to obtain an advantageous effect of minimizing an unnecessary increase in pressure of the cryogenic liquid due to residual heat of the heating element 200.

For reference, the cryogenic liquid storage apparatus 10 according to the exemplary embodiment of the present disclosure may be used to store various objects in accordance with required conditions and design specifications. The present disclosure is not restricted or limited by the type and properties of the object.

For example, the cryogenic liquid storage apparatus 10 according to the exemplary embodiment of the present disclosure may be used to store fuel (e.g., liquid hydrogen) used for mobility vehicles such as fuel cell electric vehicles (e.g., passenger vehicles or commercial vehicles) to which a fuel cell system is applied, ships, and aircraft.

The storage container 100 is provided to store liquid hydrogen (cryogenic liquid hydrogen) used for the fuel cell stack.

Hereinafter, an example will be described in which the cryogenic liquid storage apparatus 10 includes only the single storage container 100. According to another exemplary embodiment of the present disclosure, the cryogenic liquid storage apparatus may include a plurality of storage containers configured to independently store cryogenic liquids.

The storage container 100 may have various structures configured for storing the liquid hydrogen (e.g., at −253° C. based on atmospheric pressure). The present disclosure is not restricted or limited by the type and structure of the storage container 100.

Figure 2:
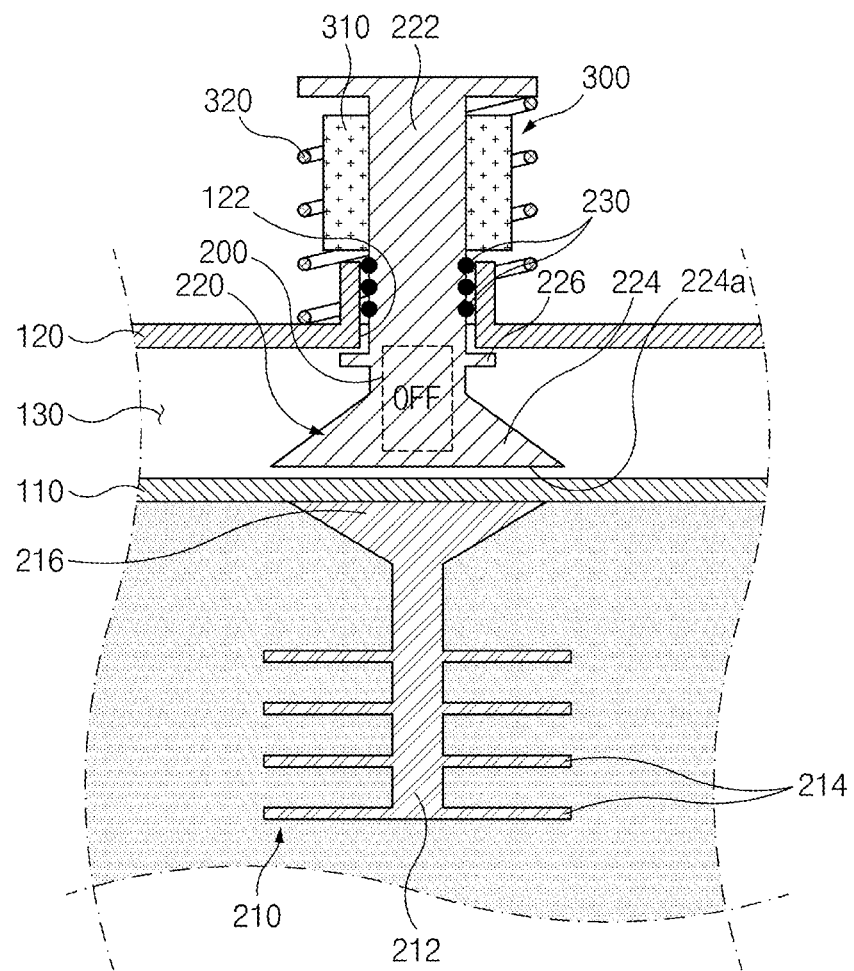
FIG. 2 and FIG. 3 are views for explaining a heating element of the cryogenic liquid storage apparatus according to the exemplary embodiment of the present disclosure.
Figure 3:
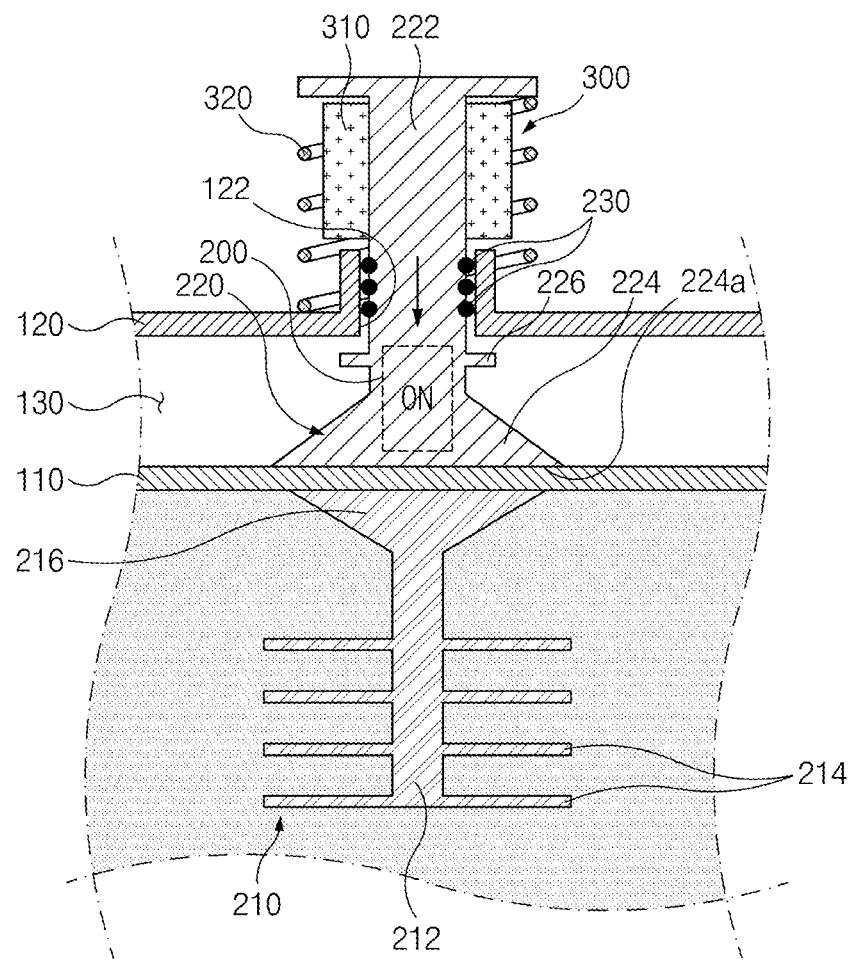

With reference to FIG. 1, FIG. 2, and FIG. 3, according to the exemplary embodiment of the present disclosure, the storage container 100 may include an internal container 110 including an accommodation space for accommodating the cryogenic liquid, and an external container 120 configured to surround a periphery of the internal container 110.

The internal container 110 and the external container 120, which form the storage container 100, may be variously changed in structure and material in accordance with required conditions and design specifications. The present disclosure is not restricted or limited by the structures and materials of the internal container 110 and the external container 120.

For example, the internal container 110 may be made of a typical thermally conductive material (e.g., metal) including thermal conductivity. According to another exemplary embodiment of the present disclosure, the internal container may include a multilayer thin-film thermal insulator (multilayer insulation (MLI)) or other materials.

The cryogenic liquid storage apparatus 10 may include a vacuum thermal insulation layer 130 defined between the internal container 110 and the external container 120.

As described above, according to the exemplary embodiment of the present disclosure, the vacuum thermal insulation layer 130 for ensuring vacuum thermal insulation (vacuum insulation) may be provided between the internal container 110 and the external container 120. Therefore, it is possible to obtain an advantageous effect of sufficiently ensuring thermal insulation performance (cryogenic thermal insulation performance) and minimizing evaporation (vaporization) of the liquid hydrogen caused by a heat inflow.

With reference to FIG. 2 and FIG. 3, the heating element 200 may apply heat to the storage container 100 to selectively increase the pressure of the cryogenic liquid.

The heating element 200 may move from the first position (contact position) at which the heating element 200 is in contact with an external surface of the internal container 110 to the second position (spacing position) at which the heating element 200 is spaced from the external surface of the internal container 110. The heat generated by the heating element 200 may be transferred to the storage container 100 only in a state in which the heating element 200 is disposed at the first position thereof. The thermal conduction from the heating element 200 to the storage container 100 may be blocked in a state in which the heating element 200 is disposed at the second position.

A typical heat generation device configured for selectively generating heat may be used as the heating element 200. The present disclosure is not restricted or limited by the type and structure of the heating element 200.

For example, a typical electric heater, which generates heat, when power is applied to the electric heater, and stops generating heat when power is cut off, may be used as the heating element 200. Alternatively, a PTC heater or other heat generating members may be used as the heating element 200. Hereinafter, an example will be described in which the heating element 200 is provided in a form of an approximately quadrangular block.

The heating element 200 may be configured to move from the first position to the second position in various ways in accordance with required conditions and design specifications.

For reference, in the exemplary embodiment of the present disclosure, the configuration in which the heating element 200 moves from the first position to the second position may include both a configuration in which the heating element 200 moves along a straight route from the first position to the second position and a configuration in which the heating element 200 moves along a curved route (or rotates).

Hereinafter, an example will be described in which the heating element 200 is configured to rectilinearly move in an upward/downward direction (based on FIG. 2) from the first position to the second position (or from the second position to the first position).

According to another exemplary embodiment of the present disclosure, the heating element may rotate or move along a curved route (e.g., arc route) from the first position to the second position.

With reference to FIG. 2 and FIG. 3, according to the exemplary embodiment of the present disclosure, the cryogenic liquid storage apparatus 10 may include a heat transfer structure 220 configured to surround a periphery of the heating element 200. The heat generated from the heating element 200 may be transferred (conducted) to the internal container 110 via the heat transfer structure 220.

The heat transfer structure 220 may be made of a typical thermally conductive material (e.g., metal) including thermal conductivity. The present disclosure is not restricted or limited by the material and structure of the heat transfer structure 220.

For reference, in the exemplary embodiment of the present disclosure illustrated and described above, the example has been described in which the heat from the heating element 200 is transferred to the internal container 110 via the heat transfer structure 220. However, according to another exemplary embodiment of the present disclosure, the heating element may come into direct contact with the storage container (inner container) without a separate heat transfer structure.

According to the exemplary embodiment of the present disclosure, the heat transfer structure 220 may include a piston portion 222 configured to be movable in directions in which the piston portion 222 approaches or moves away from the internal container 110 by the drive portion 300, and a contact portion 224 provided at an end portion of the piston portion 222 while surrounding a periphery of the heating element 200 and configured to come into contact with the internal container 110.

The piston portion 222 may be configured to be rectilinearly movable in the directions in which the piston portion 222 approaches and moves away from the external surface of the internal container 110.

The piston portion 222 may be configured to be rectilinearly moved by driving power of the drive portion 300 in the directions in which the piston portion 222 approaches and moves away from the external surface of the internal container 110 (the upward/downward direction based on FIG. 2).

For example, the piston portion 222 may be provided in a form of an approximately straight rod. The heating element 200 may be accommodated in an accommodation groove provided in the piston portion 222. Furthermore, the accommodation groove may be filled with a bonding agent, varnish, or the like in a state in which the heating element 200 is accommodated in the accommodation groove.

Hereinafter, an example will be described in which a through-hole 122 is provided in the external container 120, and the piston portion 222 is disposed to pass through the through-hole 122. For example, one end portion (a lower end portion based on FIG. 2) of the piston portion 222 may be disposed between the external container 120 and the internal container 110, and the other end portion (an upper end portion based on FIG. 2) of the piston portion 222 may be externally exposed of the external container 120 through the through-hole 122.

The contact portion 224 may be provided integrally at an end portion of the piston portion 222 and configured to surround a periphery of the heating element 200.

The contact portion 224 may have various structures configured for coming into contact with the external surface of the internal container 110. The present disclosure is not restricted or limited by the structure and shape of the contact portion 224.

The contact portion 224 may include a cross-sectional area further expanded than that of the heating element 200. For example, the contact portion 224 may include an approximately triangular cross-sectional shape including cross-sectional area further expanded than that of the heating element 200.

As described above, the contact portion 224 may include a cross-sectional area further expanded than that of the heating element 200, which makes it possible to ensure a sufficient area in which the heat is transferred (conducted) from the heating element 200 to the internal container 110. Therefore, it is possible to obtain an advantageous effect of stably ensuring thermal conduction performance by the heating element 200.

The contact portion 224 may be configured to come into surface-contact with the external surface of the internal container 110.

In the instant case, the configuration in which the contact portion 224 comes into surface-contact with the external surface of the internal container 110 may be understood as a configuration in which the contact portion 224 comes into contact with the external surface of the internal container 110 without a gap.

As described above, because the contact portion 224 is configured to come into surface-contact with the external surface of the internal container 110, it is possible to obtain an advantageous effect of improving an effect of conducting heat from the heating element 200 to the internal container 110 and an advantageous effect of minimizing the time required for thermal conduction (the time required to heat the cryogenic liquid).

For example, with reference to FIG. 2 and FIG. 3, a contact surface 224a of the contact portion 224, which comes into contact with the internal container 110, may be defined as a flat surface (straight shape).

Figure 4:
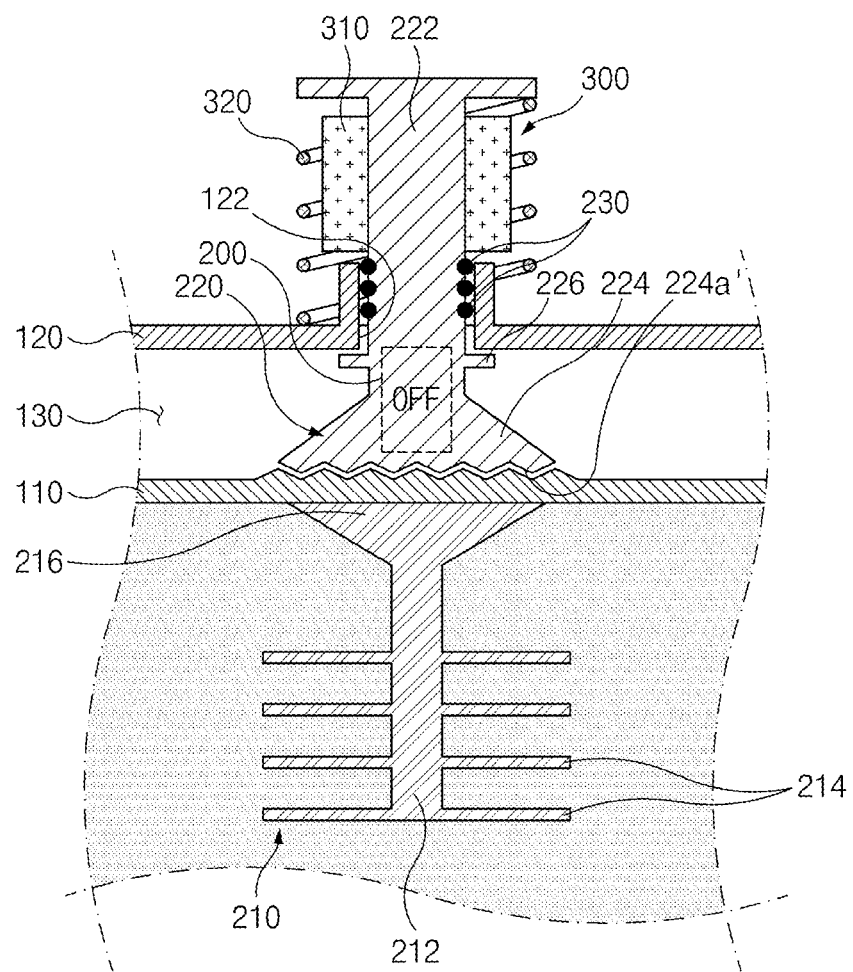
FIG. 4 and FIG. 5 are views for explaining a modified example of a contact surface of a contact portion of the cryogenic liquid storage apparatus according to the exemplary embodiment of the present disclosure.
Figure 5:
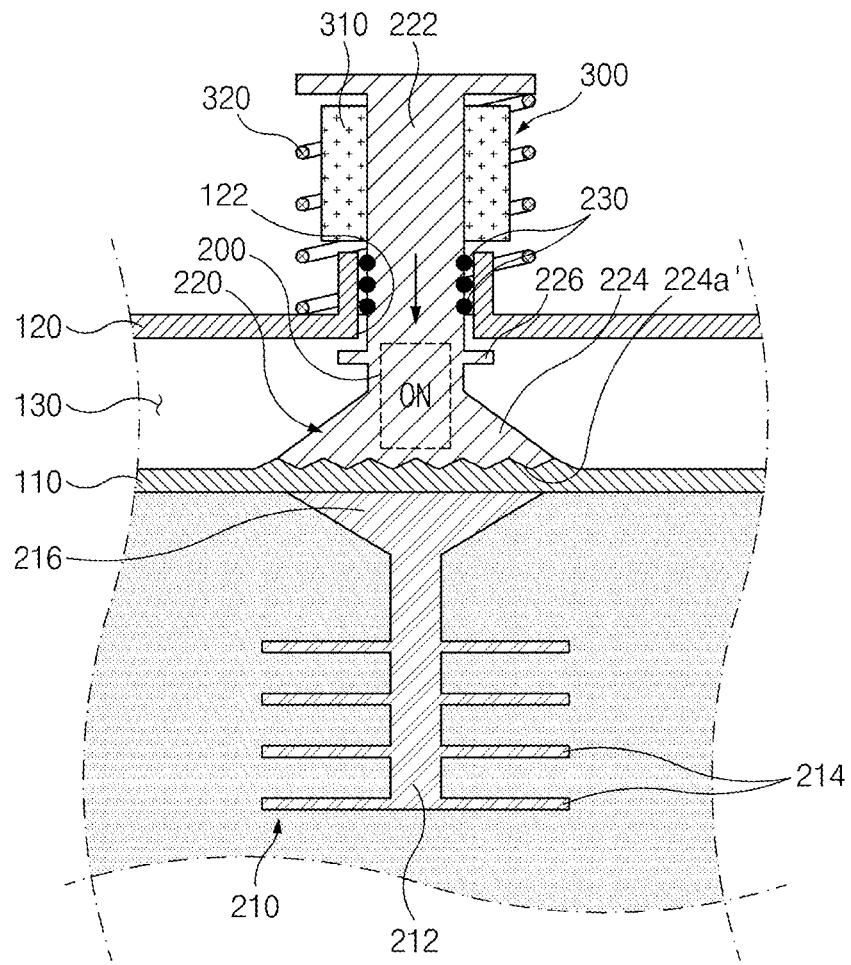

Alternatively, as illustrated in FIG. 4 and FIG. 5, a contact surface 224a' of the contact portion 224, which comes into contact with the internal container 110, may be defined as a non-flat surface. For example, the contact surface 224a' of the contact portion 224 may include an approximately serrated shape (or an embossment protrusion shape). An internal container contact portion, which includes a serrated shape configured for coming into surface (close) contact with the contact surface 224a' of the contact portion 224, may be provided on an external surface of the internal container 110. Alternatively, the contact surface of the contact portion may include a circular arc shape or other curved shapes.

According to the exemplary embodiment of the present disclosure, the cryogenic liquid storage apparatus 10 may include the heat transfer member 210 provided on an internal surface of the internal container 110. The heating element 200 may be configured to come into contact with the external surface of the internal container 110 that corresponds to the heat transfer member 210.

The heat transfer member 210 may be configured to concentrate the heat, which is generated by the heating element 200, on the cryogenic liquid (transfer the heat to the cryogenic liquid) instead of the storage container 100.

That is, the heat generated by the heating element 200 needs to be used to increase the pressure (temperature) of the cryogenic liquid. If the entire storage container 100 is heated by the heat generated by the heating element 200, the heat transferred to the storage container 100 may cause the performance in heating the cryogenic liquid to deteriorate, and the time required to heat the cryogenic liquid may increase.

In contrast, according to the exemplary embodiment of the present disclosure, the heat transfer member 210 may be provided, and the heat generated by the heating element 200 may be concentrated on the cryogenic liquid (transferred to the cryogenic liquid) by the heat transfer member 210. Therefore, it is possible to obtain an advantageous effect of improving the performance in heating the cryogenic liquid and shortening the time required to heat the cryogenic liquid.

The heat transfer member 210 may have various structures configured for concentrating the heat, which is conducted to the storage container 100, on the cryogenic liquid. The present disclosure is not restricted or limited by the structure and shape of the heat transfer member 210.

According to the exemplary embodiment of the present disclosure, the heat transfer member 210 may include a body portion 212 protruding from the internal surface of the internal container 110, and fin portions 214 protruding from a surface of the body portion 212.

The heat transfer member 210 may be disposed in the storage container 100 to be immersed in the cryogenic liquid. Alternatively, the heat transfer member 210 may be disposed in the storage container 100 and provided above a liquid surface of the cryogenic liquid to be spaced from the liquid surface of the cryogenic liquid.

For example, the body portion 212 may include an approximately straight shape and be in contact with (attached or coupled to) the internal surface of the internal container 110. The fin portion 214 may include an approximately straight shape and provided as a plurality of fin portions 214 disposed on the surface of the body portion 212 and spaced from one another. According to another exemplary embodiment of the present disclosure, the body portion and the fin portion may each include a curved shape or other shapes.

Furthermore, an enlarged portion 216 may be provided at an end portion of the body portion 212 which is in contact with the internal surface of the internal container 110, and the enlarged portion 216 may correspond to the contact portion 224. The enlarged portion 216 may include a cross-sectional area further expanded than that of the body portion 212. The heat, which is conducted to the enlarged portion 216 via the internal container 110, may be transferred to the body portion 212.

Meanwhile, in the exemplary embodiment of the present disclosure illustrated and described above, the example has been described in which the heat transfer member 210 is directly connected to the internal surface of the internal container 110 (so that the thermal conduction is possible). However, according to another exemplary embodiment of the present disclosure, a thermal conduction layer may be provided between the heat transfer member and the internal container.

Figure 6:
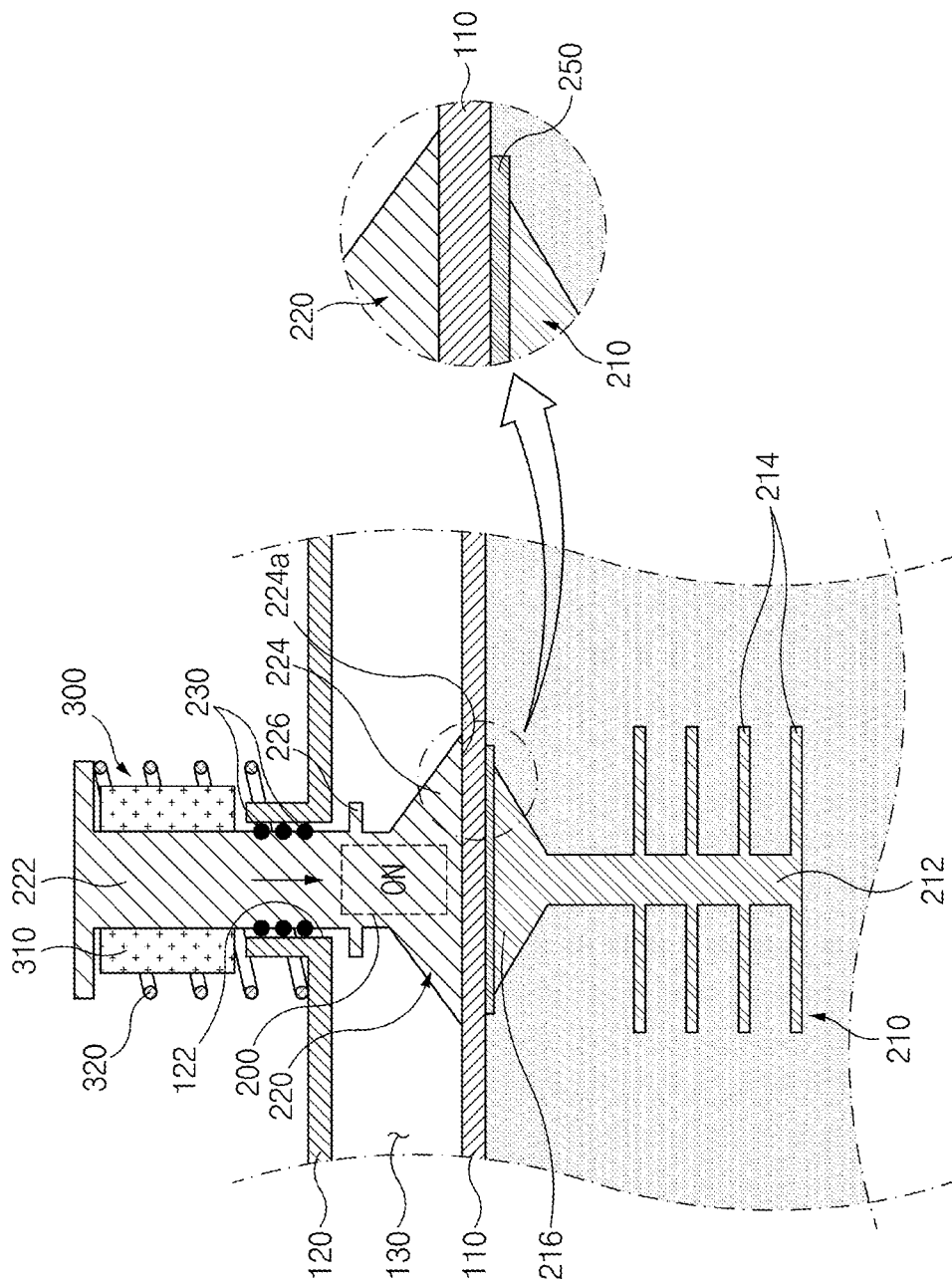
FIG. 6 is a view for explaining a thermal conduction layer of the cryogenic liquid storage apparatus according to the exemplary embodiment of the present disclosure.

With reference to FIG. 6, according to the exemplary embodiment of the present disclosure, the cryogenic liquid storage apparatus 10 may include a thermal conduction layer 250 provided between the heat transfer member 210 and the internal container 110 to be in contact with the heat transfer member 210 and the internal container 110.

The thermal conduction layer 250 may be made of various materials configured for improving thermal conductivity (adhesion) between the internal container 110 and the heat transfer member 210. The present disclosure is not restricted or limited by the material and properties of the thermal conduction layer 250.

For example, a typical thermally conductive bonding agent, grease, or the like including thermally conductivity may be used as the thermal conduction layer 250.

With reference to FIG. 2 and FIG. 3, the drive portion 300 may be configured to selectively provide driving power to move the heating element 200 from the second position to the first position.

Various drive devices configured for providing driving power for moving the heating element 200 may be used as the drive portion 300. The present disclosure is not restricted or limited by the type and structure of the drive portion 300.

According to the exemplary embodiment of the present disclosure, the drive portion 300 may include a solenoid 310. The piston portion 222 may be configured to be selectively moved rectilinearly by driving power of the solenoid 310.

For example, the drive portion 300 may be provided outside (on an external surface of) the external container 120. The piston portion 222 including passed through the through-hole 122 of the external container 120 may be rectilinearly moved by driving power of the drive portion 300.

The solenoid 310 may have various structures configured for providing driving power for operating the piston portion 222. The present disclosure is not restricted or limited by the type and structure of the solenoid 310.

For example, the solenoid 310 may include a bobbin provided outside (e.g., on an external surface of) the external container 120 and configured to surround a periphery of the piston portion 222, a coil wound around the bobbin, and a yoke disposed between the bobbin and the piston portion 222.

For reference, the movement of the piston portion 222 relative to the solenoid 310 may be controlled by applying power to the coil. Because the solenoid 310 according to an exemplary embodiment of the present disclosure includes the bobbin and the coil according to the publicly-known technology including the above-mentioned configuration and operational principle, a detailed description thereof will be omitted.

According to the exemplary embodiment of the present disclosure, the cryogenic liquid storage apparatus 10 may include an elastic member 320 configured to provide an elastic force to move the piston portion 222 in a direction in which the piston portion 222 moves away from the internal container 110.

The elastic member 320 may be provided to elastically support the movement of the piston portion 222 relative to the internal container 110.

Various elastic bodies configured for elastically supporting the movement of the piston portion 222 relative to the internal container 110 may be used as the elastic member 320. The present disclosure is not restricted or limited by the type and structure of the elastic member 320.

For example, a spring member (e.g., coil spring) may be used as the elastic member 320. The piston portion 222 may be elastically moved by an elastic force of the spring member in the directions in which the piston portion 222 approaches and moves away from the external surface of the internal container 110.

A flange portion may be provided at an upper end portion (based on FIG. 2) of the piston portion 222 and include a cross-sectional area further expanded than that of the piston portion 222. The spring member for elastically supporting the movement of the piston portion 222 may be located between the flange portion and the external container 120.

With the above-mentioned structure, when the supply of power applied to the solenoid 310 is cut off in a state in which the heating element 200 is disposed at the first position (a state in which the piston portion 222 is moved to approach the internal container 110), the piston portion 222 may be moved upward by the elastic force of the elastic member 320 so that the heating element 200 may move to the second position at which the heating element 200 is spaced from the external surface of the internal container 110.

Meanwhile, in the exemplary embodiment of the present disclosure illustrated and described above, the example has been described in which the piston portion 222 is rectilinearly moved by driving power of the solenoid 310. However, according to another exemplary embodiment of the present disclosure, a motor or other drive device may be used to rectilinearly move the piston portion.

According to the exemplary embodiment of the present disclosure, the cryogenic liquid storage apparatus 10 may include a stopper portion 226 configured to selectively restrict the movement of the piston portion 222 relative to the external container 120.

The stopper portion 226 may be configured to suppress an excessive upward movement of the piston portion 222 and stably maintain the state in which the heating element 200 is disposed at the second position.

The stopper portion 226 may have various structures configured for selectively restricting the movement of the piston portion 222 relative to the external container 120. The present disclosure is not restricted or limited by the structure of the stopper portion 226.

For example, the stopper portion 226 may be provided on the external surface of the piston portion 222 to be restrained on the internal surface of the external container.

For example, the stopper portion 226 may be provided on an external peripheral surface of the piston portion 222 to include a continuous annular shape in a circumferential direction of the piston portion 222 (e.g., an annular shape including a diameter greater than that of the through-hole). According to another exemplary embodiment of the present disclosure, a plurality of stopper portions may be provided to be spaced from one another in the circumferential direction of the piston portion. Alternatively, the stopper portion may be provided outside the external container and configured to restrict the movement of the piston portion relative to the external container.

According to the exemplary embodiment of the present disclosure, the cryogenic liquid storage apparatus 10 may include a sealing member 230 configured to seal a gap between the piston portion 222 and the through-hole 122.

The sealing member 230 may be configured to stably maintain the vacuum thermal insulation layer 130 defined between the internal container 110 and the external container 120.

The sealing member 230 may have various structures configured for sealing (blocking) a gap between the piston portion 222 and the through-hole 122. The present disclosure is not restricted or limited by the type and structure of the sealing member 230.

For example, with reference to FIG. 2 and FIG. 3, the sealing member 230 may include a circular annular shape including a diameter corresponding to the through-hole 122 and be located between an internal surface of the through-hole 122 and an external surface of the piston portion 222.

For example, the sealing member 230 may be made of a typical elastic material such as elastomer, rubber, or silicone which is elastically compressible and restorable. The present disclosure is not restricted or limited by the material and properties of the sealing member 230.

Figure 7:
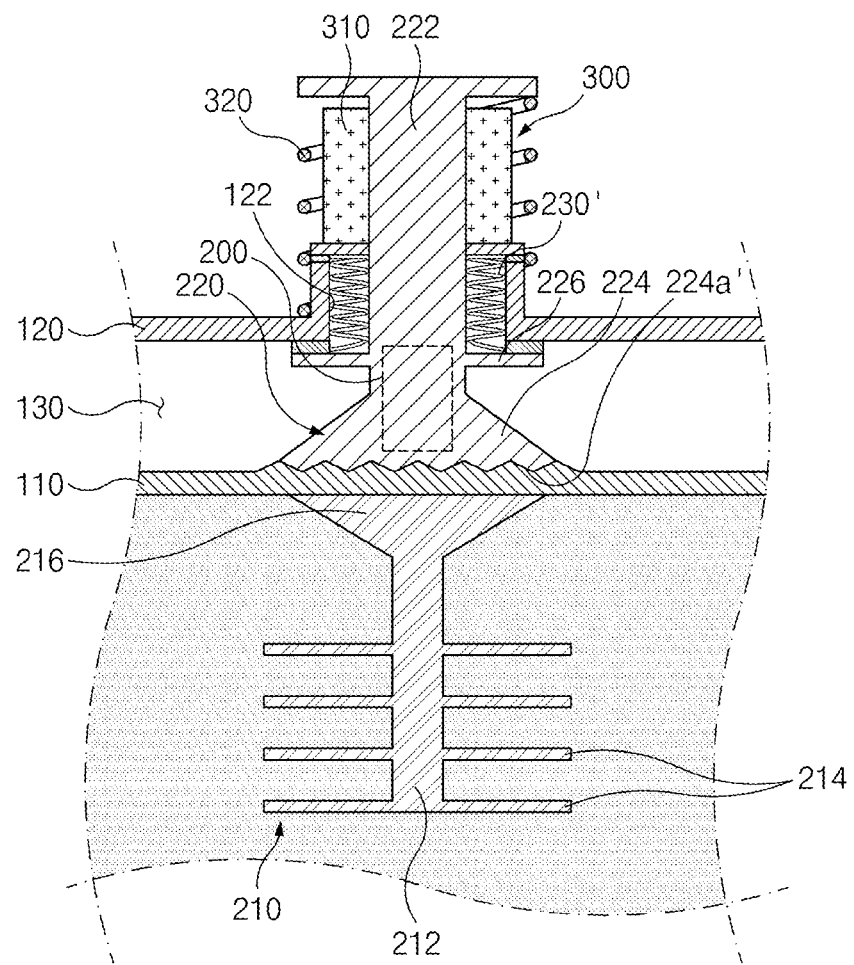
FIG. 7 is a view for explaining a modified example of a sealing member of the cryogenic liquid storage apparatus according to the exemplary embodiment of the present disclosure.

As an exemplary embodiment of the present disclosure, with reference to FIG. 7, a bellows sealing member 230' including a bellows structure may be used as the sealing member 230'.

For example, the bellows sealing member 230' may include a first end portion ring supported on the external surface of the external container 120, a second end portion ring supported on the internal surface of the external container 120, and a bellows portion disposed between the internal surface of the through-hole 122 and the external surface of the piston portion 222 and including one end portion connected to the first end portion ring and the other end portion connected to the second end portion ring.

As described above, the bellows portion of the bellows sealing member 230' may be spaced from the external surface of the piston portion 222 and the internal surface of the through-hole 122 without being in direct contact with the external surface of the piston portion 222 and the internal surface of the through-hole 122. Therefore, it is possible to obtain an advantageous effect of minimizing abrasion caused by the rectilinear movement of the piston portion 222 and improving durability and sealing stability.

Meanwhile, in the exemplary embodiment of the present disclosure illustrated and described above, the example has been described in which the heat generated by the heating element 200 is concentrated on the cryogenic liquid (transmitted to the cryogenic liquid) by the heat transfer member 210 separately attached to the internal container 110. According to another exemplary embodiment of the present disclosure, a heat transfer portion 112 may be provided integrally with the internal container 110 instead of the heat transfer member 210.

Figure 8:
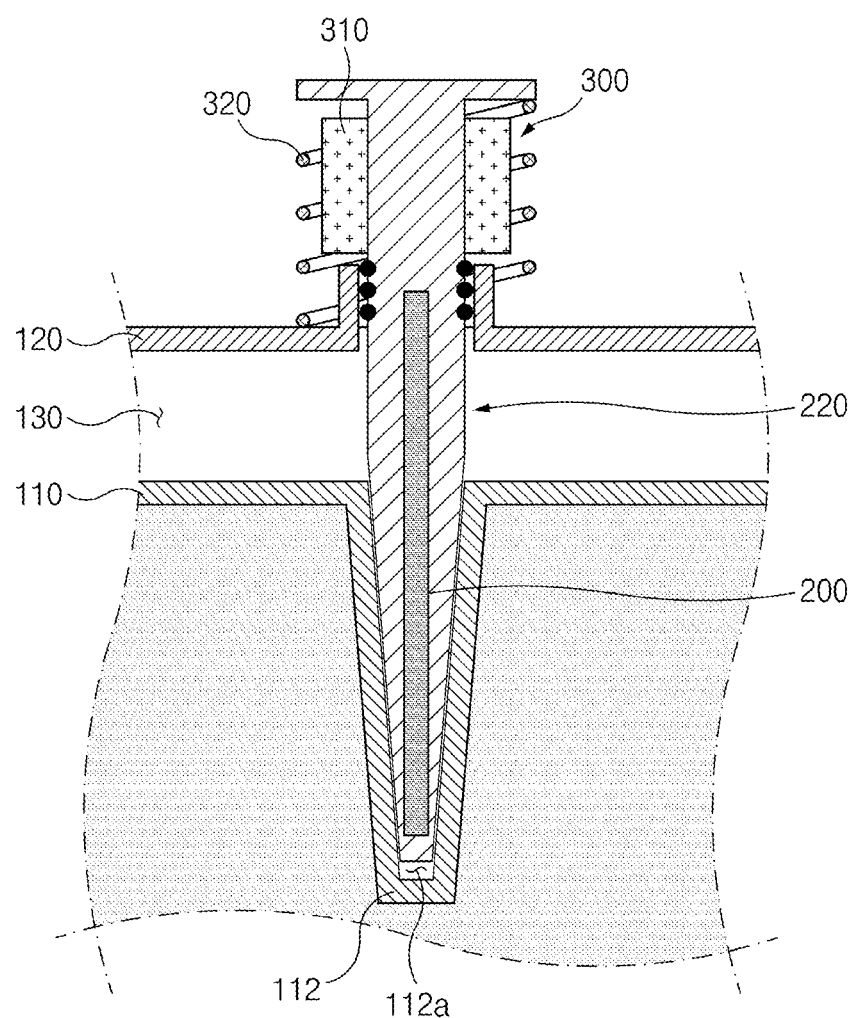
FIG. 8 and FIG. 9 are views for explaining a heat transfer portion of an internal container of the cryogenic liquid storage apparatus according to the exemplary embodiment of the present disclosure.
Figure 9:
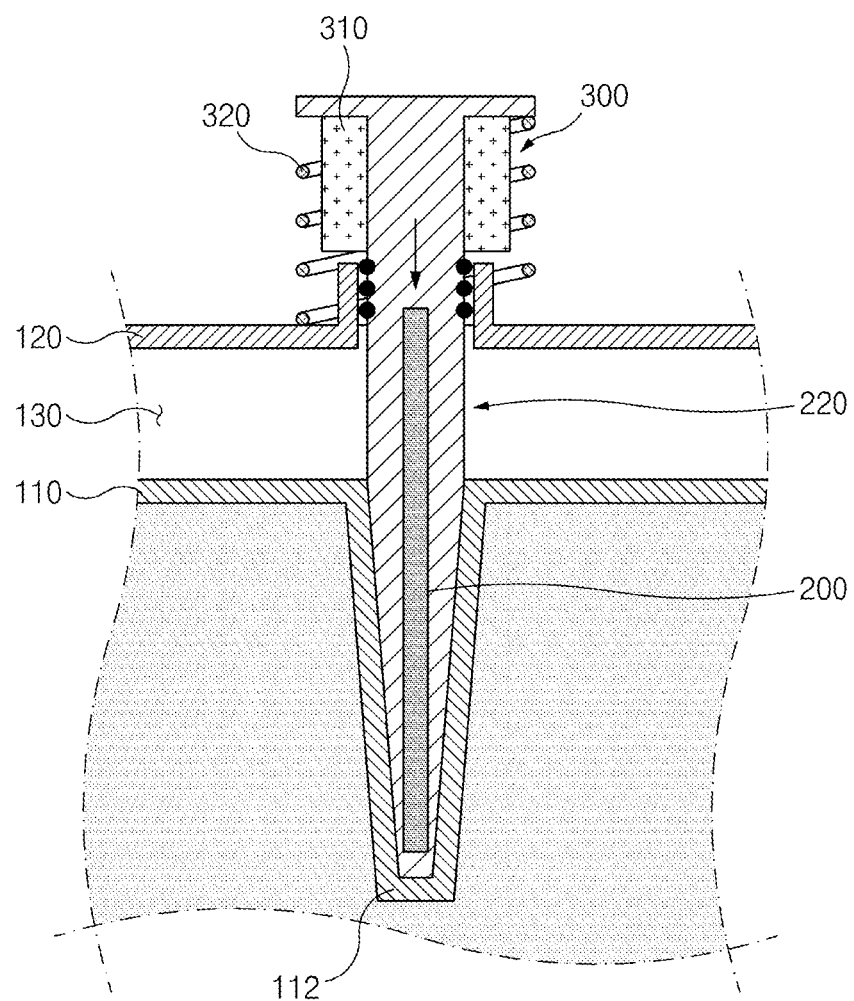

With reference to FIG. 8 and FIG. 9, according to the exemplary embodiment of the present disclosure, the cryogenic liquid storage apparatus 10 may include the heat transfer portion 112 provided integrally with the internal container 110 while protruding from the internal surface of the internal container 110 and configured to define an accommodation space 112a in which the heating element 200 is accommodated.

For example, the heat transfer portion 112 may be provided integrally with the internal container 110 while protruding from the internal surface of the internal container 110 by partially processing (e.g., press-process) a portion of the internal container 110.

The heat transfer portion 112 may have various structures configured for accommodating and coming into contact with the heating element 200. The present disclosure is not restricted or limited by the structure and shape of the heat transfer portion 112.

For example, the heat transfer portion 112 may protrude from the internal surface of the internal container 110 to include a kind of wedge shape including a cross-sectional area that gradually decreases in a direction from one end portion (an upper end portion based on FIG. 8) to the other end portion (a lower end portion based on FIG. 8). The accommodation space 112a in which the heating element 200 may be accommodated may be defined in an external surface (a surface facing the external container) of the heat transfer portion 112.

The heat transfer structure 220, which accommodates the heating element 200 therein, may include a shape corresponding to the accommodation space 112a.

The heat transfer structure 220 may be configured to be movable from a first position (contact position) at which the heat transfer structure 220 is in contact with a wall surface of the accommodation space 112a (e.g., a bottom surface and a lateral surface of the accommodation space) (the external surface of the internal container) to a second position (spacing position) at which the heat transfer structure 220 is spaced from the wall surface of the accommodation space 112a. The heat generated by the heating element 200 may be conducted to the cryogenic liquid via the heat transfer structure 220 and the heat transfer portion 112 only in the state in which the heating element 200 is disposed at the first position thereof. The thermal conduction from the heating element 200 to the cryogenic liquid may be blocked in the state in which the heating element 200 is disposed at the second position.

As described above, according to the exemplary embodiment of the present disclosure, it is possible to obtain an advantageous effect of improving efficiency in storing the cryogenic liquid.

According to the exemplary embodiment of the present disclosure, it is possible to ensure thermal insulation performance of the storage container and increase pressure (temperature) of the cryogenic liquid only when necessary (only in a situation in which an increase in pressure of the cryogenic liquid is required).

Among other things, according to the exemplary embodiment of the present disclosure, it is possible to obtain an advantageous effect of increasing pressure (temperature) of the cryogenic liquid by applying heat to the cryogenic liquid only when internal pressure of the storage container decreases, and an advantageous effect of minimizing heat to be transferred to the cryogenic liquid from the outside of the storage container when the internal pressure of the storage container satisfies a preset condition.

Furthermore, according to the exemplary embodiment of the present disclosure, it is possible to obtain an advantageous effect of minimizing an increase in pressure of the cryogenic liquid due to residual heat of the heating element.

Furthermore, according to the exemplary embodiment of the present disclosure, it is possible to obtain an advantageous effect of more accurately and precisely managing the internal pressure of the storage container.

Furthermore, according to the exemplary embodiment of the present disclosure, it is possible to obtain an advantageous effect of ensuring durability and safety, minimizing a loss of hydrogen (the discharge amount of hydrogen), and maximally delaying a time point of a loss of hydrogen (extending a non-loss hydrogen storage period).

Furthermore, according to the exemplary embodiment of the present disclosure, it is possible to obtain an advantageous effect of suppressing an excessive increase in pressure (expansion) of the storage container and improving safety and reliability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A cryogenic liquid storage apparatus comprising:
a storage container configured to accommodate a cryogenic liquid therein;
a heating element configured to be movable from a first position at which the heating element is in contact with the storage container to a second position at which the heating element is spaced from the storage container; and
a drive portion configured to selectively provide driving power to the heating element to move the heating element from the second position to the first position.

2. The cryogenic liquid storage apparatus of claim 1, wherein the storage container includes:
an internal container configured to accommodate the cryogenic liquid therein; and
an external container configured to surround a periphery of the internal container therein, and
wherein the heating element is movable in directions in which the heating element approaches and moves away from an external surface of the internal container.

3. The cryogenic liquid storage apparatus of claim 2, including:
a heat transfer structure configured to surround a periphery of the heating element,
wherein heat generated by the heating element is transferred to the internal container via the heat transfer structure.

4. The cryogenic liquid storage apparatus of claim 3, wherein the heat transfer structure includes:
a piston portion configured to be movable in directions in which the piston portion approaches or moves away from the internal container by the drive portion; and
a contact portion provided at an end portion of the piston portion while surrounding a periphery of the heating element and configured to come into contact with the internal container.

5. The cryogenic liquid storage apparatus of claim 4, wherein the contact portion includes a cross-sectional area further expanded than a cross-sectional area of the heating element.

6. The cryogenic liquid storage apparatus of claim 4, wherein the contact portion is configured to come into surface-contact with the external surface of the internal container.

7. The cryogenic liquid storage apparatus of claim 4, wherein a contact surface of the contact portion, which comes into contact with the internal container, is defined as a flat surface.

8. The cryogenic liquid storage apparatus of claim 4, wherein a contact surface of the contact portion, which comes into contact with the internal container, is defined as a non-flat surface.

9. The cryogenic liquid storage apparatus of claim 8, wherein an upper surface of the internal container, which comes into contact with the contact surface of the contact portion is defined as another non-flat surface corresponding to the non-flat surface.

10. The cryogenic liquid storage apparatus of claim 4, wherein the drive portion includes a solenoid, and the piston portion is selectively moved rectilinearly by driving power of the solenoid.

11. The cryogenic liquid storage apparatus of claim 10, including:
an elastic member configured to provide an elastic force to move the piston portion in a direction in which the piston portion moves away from the internal container.

12. The cryogenic liquid storage apparatus of claim 4, including:
a through-hole provided in the external container,
wherein the piston portion is configured to pass through the through-hole, and
wherein the drive portion is provided outside the external container.

13. The cryogenic liquid storage apparatus of claim 12, including:
a sealing member configured to seal a gap between the piston portion and the through-hole.

14. The cryogenic liquid storage apparatus of claim 4, including:
a stopper portion configured to selectively restrict a movement of the piston portion relative to the external container.

15. The cryogenic liquid storage apparatus of claim 2, including:
a heat transfer member provided on an internal surface of the internal container,
wherein the heating element comes into contact with the external surface of the internal container that corresponds to the heat transfer member.

16. The cryogenic liquid storage apparatus of claim 15, wherein the heat transfer member includes:
a body portion protruding from the internal surface of the internal container; and
a fin portion protruding from a surface of the body portion.

17. The cryogenic liquid storage apparatus of claim 15, including:
a thermal conduction layer provided between the heat transfer member and the internal container.

18. The cryogenic liquid storage apparatus of claim 17, wherein the heat transfer member includes:
a body portion protruding from the internal surface of the internal container; and
a fin portion protruding from a surface of the body portion, and wherein the thermal conduction layer is provided between the body portion of the heat transfer member and the internal container.

19. The cryogenic liquid storage apparatus of claim 2, including:
a heat transfer portion provided integrally with the internal container to protrude from an internal surface of the internal container and configured to define an accommodation space for accommodating the heating element therein.

20. The cryogenic liquid storage apparatus of claim 2, including:

a vacuum thermal insulation layer defined between the internal container and the external container.

* * * * *